US011318785B2

(12) United States Patent
Gebo

(10) Patent No.: US 11,318,785 B2
(45) Date of Patent: May 3, 2022

(54) SPLIT WHEEL AND HUB ASSEMBLY

(71) Applicant: Christopher Gebo, Salisbury, MD (US)

(72) Inventor: Christopher Gebo, Salisbury, MD (US)

(*) Notice: Subject to any disclaimer, the term of this patent is extended or adjusted under 35 U.S.C. 154(b) by 338 days.

(21) Appl. No.: 16/672,947

(22) Filed: Nov. 4, 2019

(65) Prior Publication Data
US 2020/0139759 A1 May 7, 2020

Related U.S. Application Data

(60) Provisional application No. 62/754,718, filed on Nov. 2, 2018.

(51) Int. Cl.
*B60B 27/06* (2006.01)
*B60B 5/02* (2006.01)
*B60B 25/02* (2006.01)
*B60B 9/00* (2006.01)
*A47C 1/14* (2006.01)

(52) U.S. Cl.
CPC .............. *B60B 27/065* (2013.01); *B60B 5/02* (2013.01); *B60B 25/02* (2013.01); *A47C 1/14* (2013.01); *B60B 9/005* (2013.01); *B60B 2200/22* (2013.01)

(58) Field of Classification Search
CPC ......... B60B 27/065; B60B 5/02; B60B 9/005; B60B 21/021; B60B 21/025; B60B 21/04; B60B 23/00; B60B 23/02; B60B 25/002; B60B 25/02; B60B 2200/22; B60B 37/10; B60B 3/082; A47C 1/14
See application file for complete search history.

(56) References Cited

U.S. PATENT DOCUMENTS

| 482,864 | A | * | 9/1892 | Conradson | F16H 55/12 74/448 |
| 692,602 | A | * | 2/1902 | Bicalky | F16H 55/44 474/97 |
| 2,022,348 | A | * | 11/1935 | Hoerle | A63C 17/22 301/5.7 |
| 2,544,387 | A | * | 3/1951 | Kerr | B60B 3/085 301/65 |
| 2,726,106 | A | * | 12/1955 | Houck | B60B 35/1027 403/16 |
| 3,083,585 | A | * | 4/1963 | Dawe | F16H 55/12 474/96 |
| 4,043,603 | A | * | 8/1977 | Bergmann | A63H 17/262 301/64.707 |
| 2006/0070777 | A1 | * | 4/2006 | Ducharme | B62M 7/12 180/65.1 |

FOREIGN PATENT DOCUMENTS

WO    WO-9638210 A1 * 12/1996    ........... A63C 17/223

* cited by examiner

*Primary Examiner* — Kip T Kotter
(74) *Attorney, Agent, or Firm* — MIPLRC/IPEC Univ. Baltimore, Carey School of Law

(57) ABSTRACT

A wheel and hub assembly. Such a wheel includes split adapters, split hubs and split wheels. The assembly is attached to any beach chair or other article of manufacture which has a rod or pipe in its structure. Also, the wheel can be adapted on variously sized pipes and enable a user to easily pull/roll a beach chair or other articles of manufacture on various surfaces including a sandy beach or lawn.

13 Claims, 7 Drawing Sheets

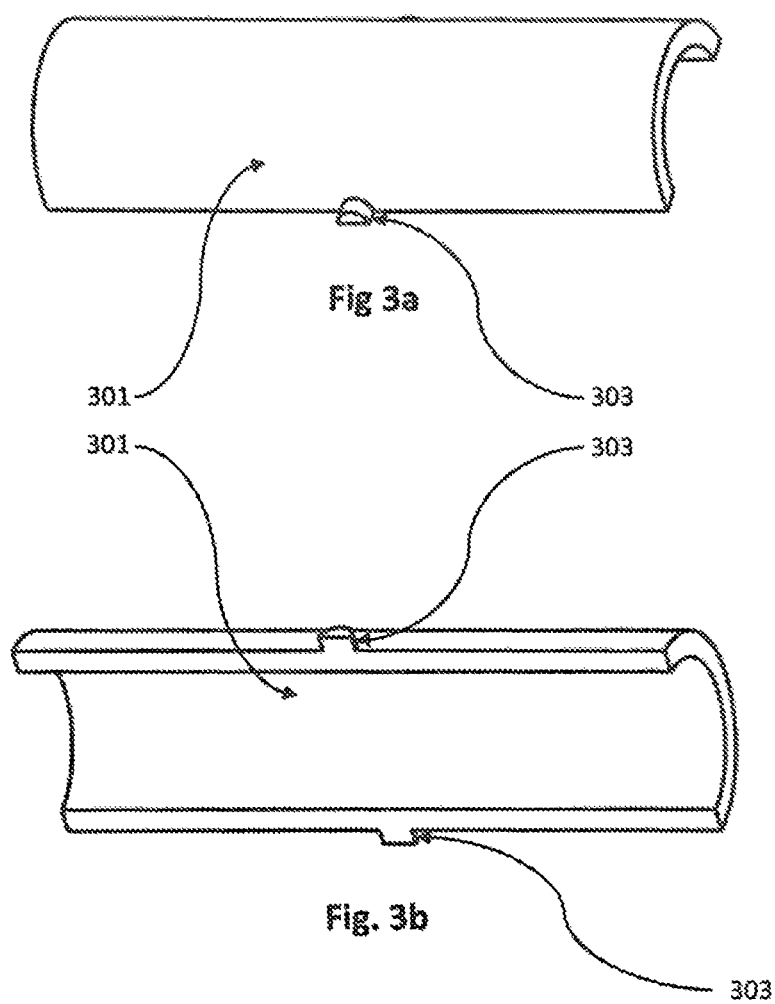

SPLIT WHEEL AND HUB ASSEMBLY

CROSS-REFERENCE

This patent application claims priority to U.S. Provisional Application No. 62/754,718, filed on Nov. 2, 2018, which is included herein by reference in its entirety.

TECHNOLOGICAL FIELD

The present invention relates to wheel assemblies and converting nonwheeled articles into wheeled articles.

BACKGROUND

To enjoy the beach, people may bring beach chairs and other related items from their houses and cars on to the beach. However, it is generally burdensome to carry or drag the beach chairs and other related items on the sandy beach or lawn.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIGS. 3a-4d show various views of an embodiment of the split adapters.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, and referring to the Figures generally, a wheel and hub assembly may be described. According to an exemplary embodiment, such a wheel may enable a user to easily pull/roll a beach chair or other assemblies and articles of manufacture on a sandy beach, lawn or other soft or irregular surfaces. According to an exemplary embodiment, the wheel may be attached to any beach chair, or other items that have a rod, pipe or tubing in the structure. Also, in an exemplary embodiment, the wheel may be assembled and disassembled on the rod of the beach chair, or other item, without the use of tools.

Various embodiments presented hereinafter may turn the design and physical size of lawn/beach chair, or other items, to an asset. According to an exemplary embodiment, the wheel assembly may be mounted on the lower back frame section, so that the chair may be rolled rather than carried. Also, when the chair is opened, the chair may become a handcart that can be easily wheeled around, as well as support and hold coolers, blankets and other items that the picnicker, beach goer, outdoor concert attendee, etc. would want to take. Thus, the chair may be a wheeled cart easily moved from house or car to lawn or beach, serving a dual purpose.

Figure 1A:
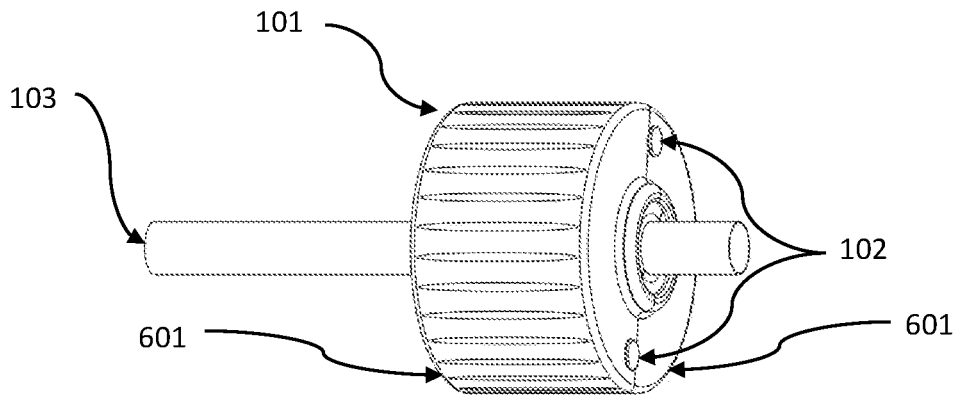
FIGS. 1a-2c show various views of an embodiment of the wheel assembly.
Figure 1B:
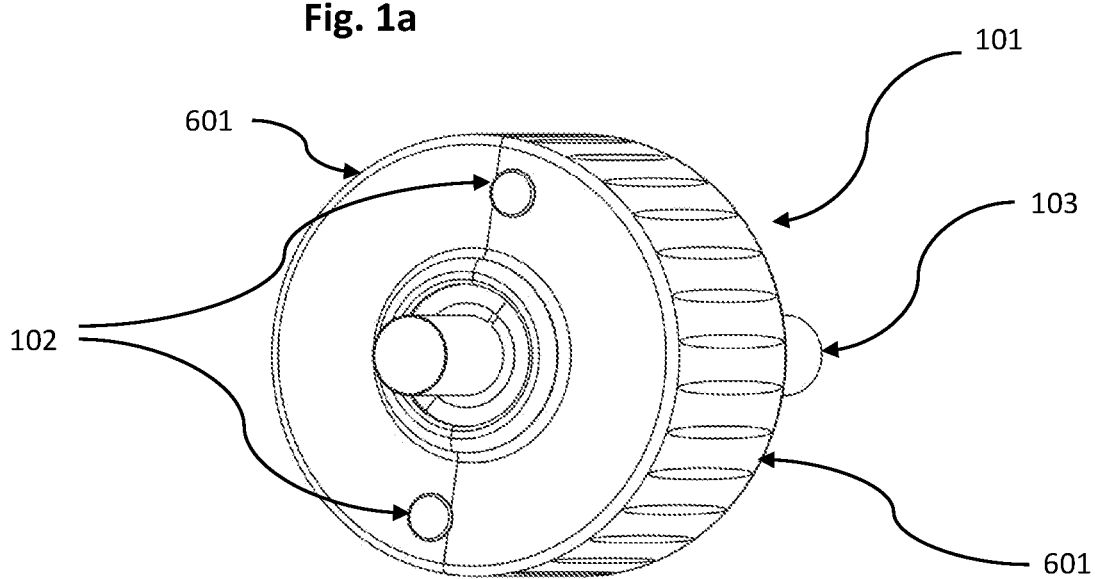
Figure 1C:
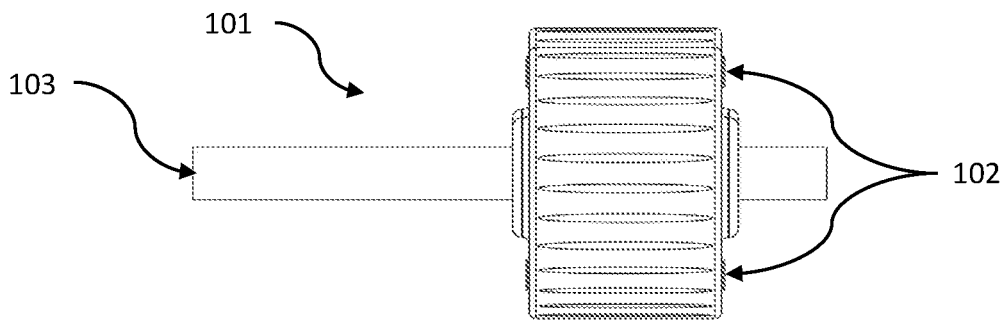

Exemplary FIGS. 1a-1c show various views of an exemplary embodiment of a wheel assembly in the context of use. In particular, FIG. 1b shows a perspective view of the wheel assembly 101 in the context of use. According to an exemplary embodiment, the wheel assembly 101 may be attached to the lower horizontal rod 103 of a beach chair, or tubes, rods and pipes in other assemblies or articles of manufacture. The split wheel 601 may freely rotate around the rod 103.

Other embodiments of the wheel assembly 101, especially as applied to larger articles of manufacture, may have more than one split wheel.

Figure 2A:
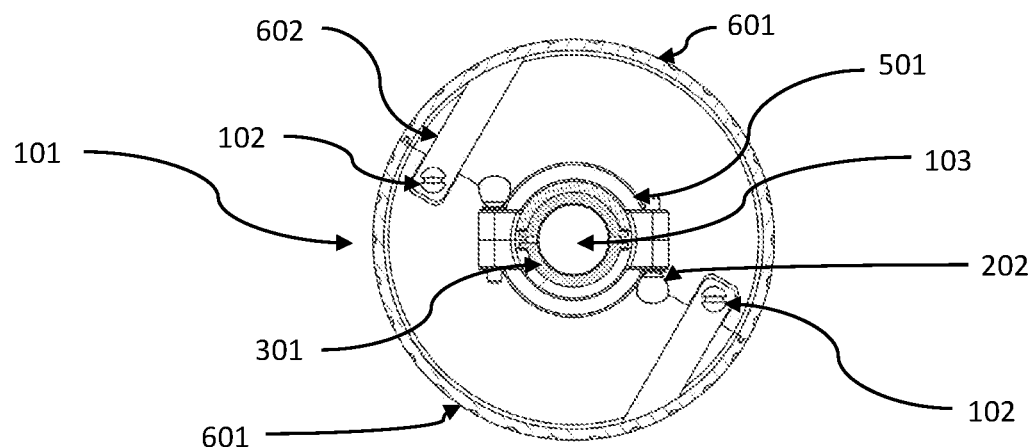
Figure 2B:
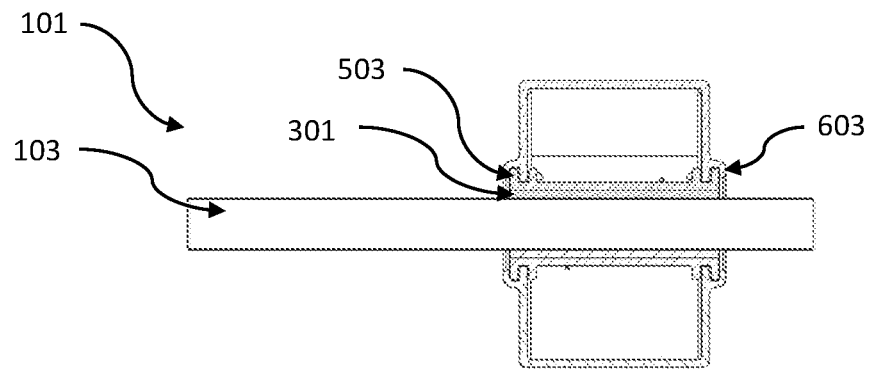
Figure 2C:
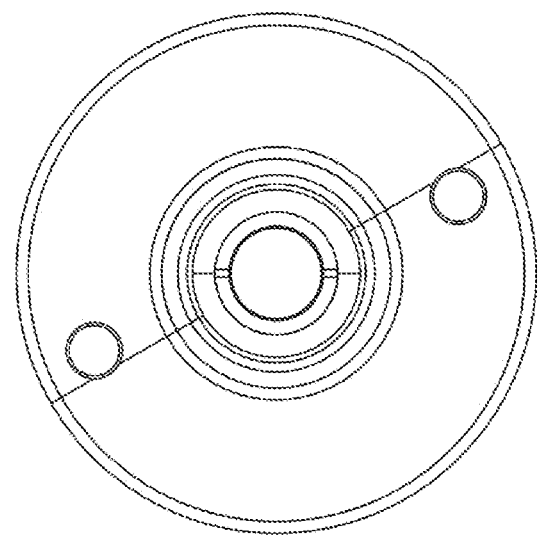
Figure 4A:
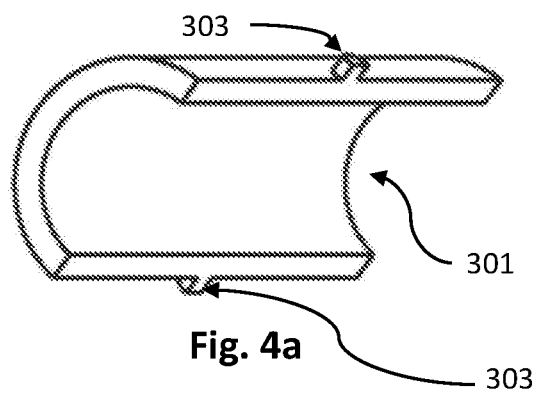
Figure 4B:
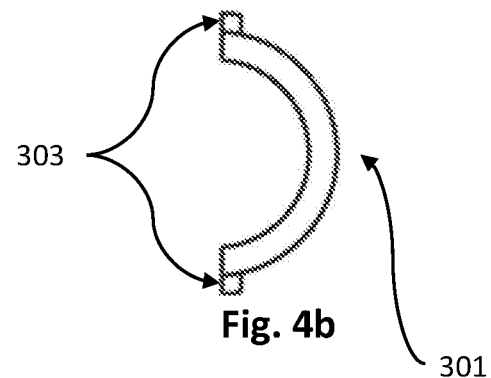
Figure 4C:
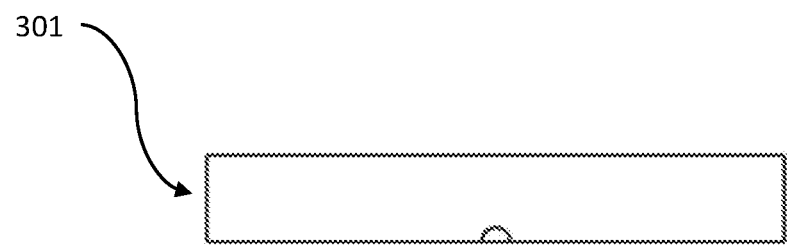
Figure 4D:
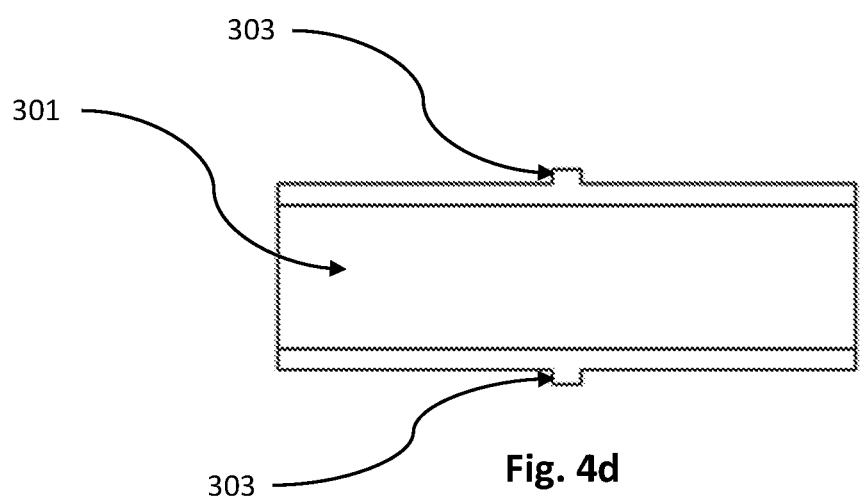

Exemplary FIGS. 2a-2b show various cross-sectional views of an exemplary embodiment of the wheel assembly in the context of use. In particular, FIG. 2a shows a cross section view from the front plane of an embodiment of the wheel assembly 101 in the context of use. According to an exemplary embodiment, the wheel assembly 101 may be attached to the rod 103 of a beach chair, or rods 103 in other assemblies or articles of manufacture. The wheel assembly 101 may include: two (2) split adapters 301 that fit around the pipe or rod 103; two (2) split hubs 501 that clamp around the split adapters 301; and two (2) split wheels 601 that are rotatably fixed around the split hubs 501.

Exemplary FIGS. 3a-4d show various views of an exemplary embodiment of a split adapter 301. In particular, FIG. 4a shows a perspective view of an embodiment of a single split adapter 301. In use, two split adapters 301 may fit around the lower horizontal rod 103 of a beach chair. In an embodiment, the split adapters 301 may be utilized to accomplish either one or both of two tasks: a) to adapt the wheel assembly 101 to fit multiple different sized rods 103; and/or b) to prevent the wheel assembly 101 from sliding along its axis of rotation. To that end, the wheel assembly 101 may be sold with multiple split adapters having varying interior radii to fit different rod 103 diameters. Further, the split adapters 301 may be manufactured entirely of, or covered with, rubber to grip the rod 103 and prevent the wheel assembly 101 from sliding along the rod. The split adapters 301 may be manufactured of other materials, known to those of ordinary skill in the art, with a sufficient coefficient of friction to prevent the wheel assembly 101 from sliding along its axis.

Each split adapter 301 may have a male fitting 303 which may fit into a corresponding female groove 502 in each split hub 501. This arrangement may be utilized to prevent the split hubs 501 from rotating around the split adapters 301.

Figure 5A:
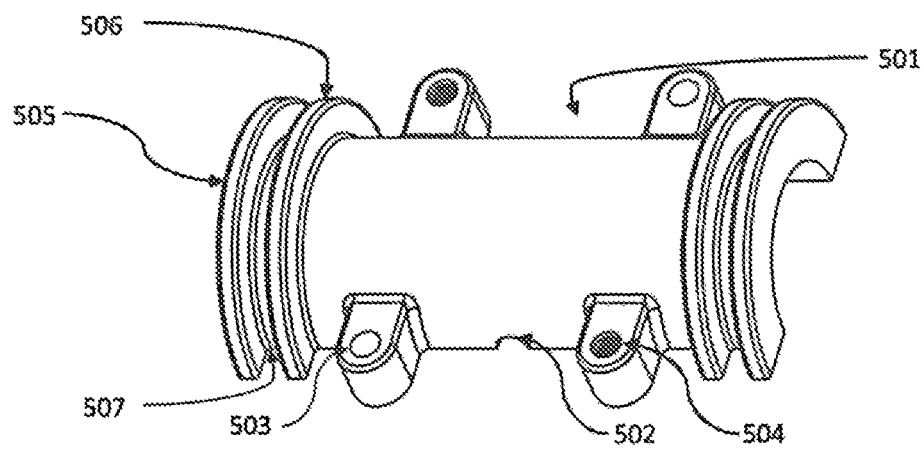
FIGS. 5a-5d show various views of an embodiment of the split hubs.
Figure 5B:
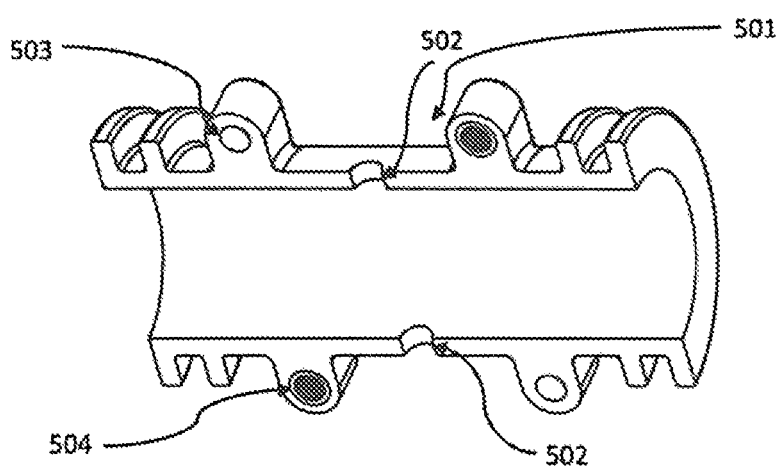
Figure 5C:
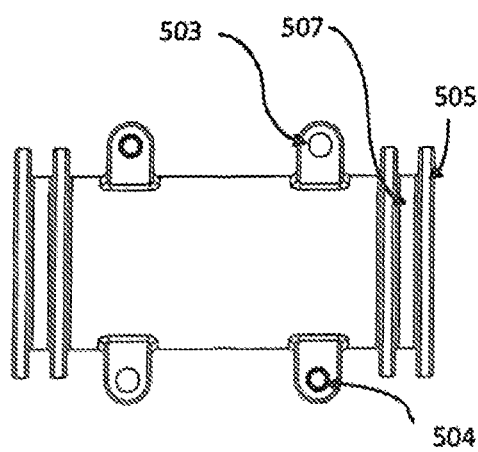
Figure 5D:
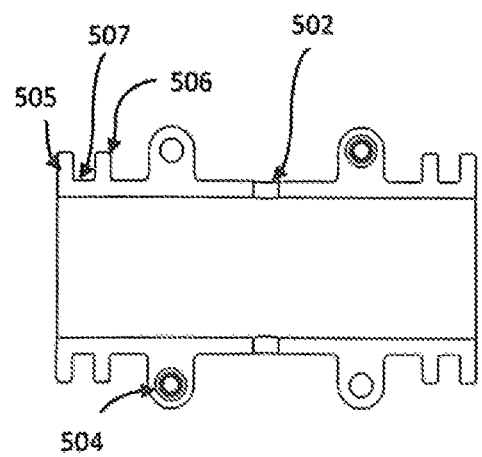
Figure 6A:
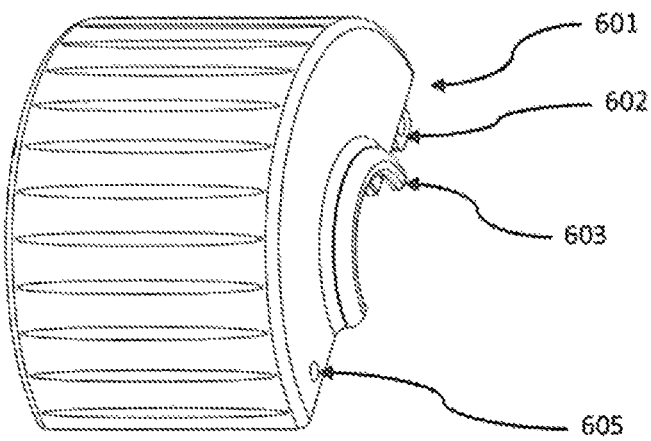
FIGS. 6a-7b show various views of an embodiment of the split wheels.
Figure 6B:
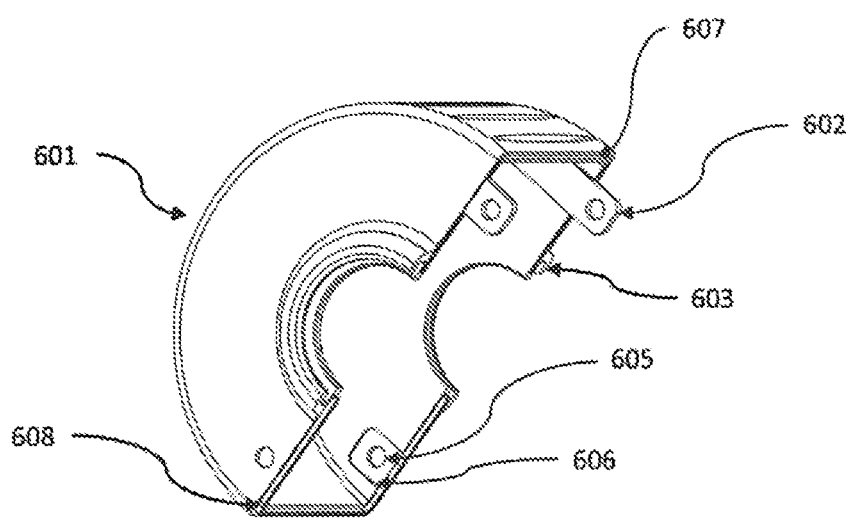
Figure 7A:
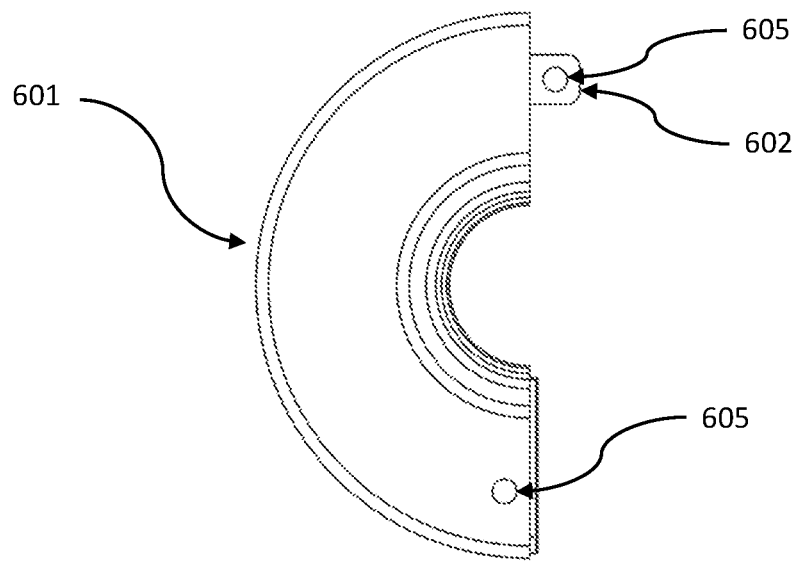
Figure 7B:
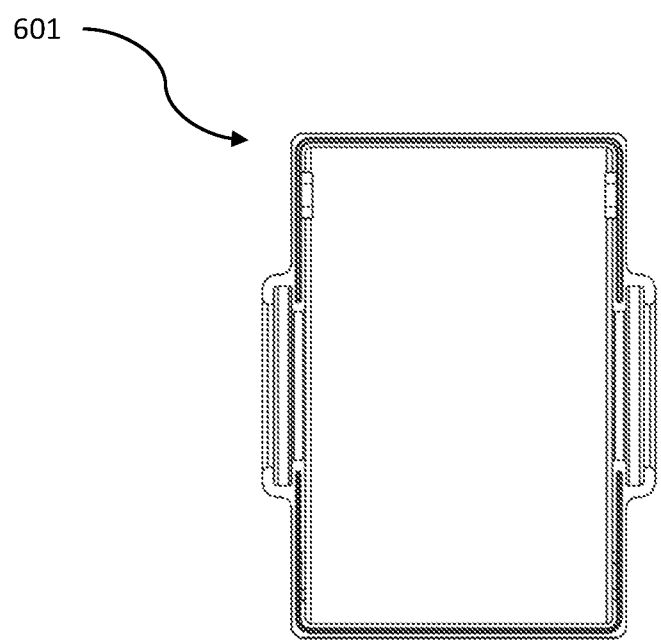

Exemplary FIGS. 5a-5d show various views of an exemplary embodiment of a split hub 501. In particular, FIG. 5a shows a perspective view of the top side of an embodiment of a split hub 501. The split hub 501 may be manufactured of plastic, metal or any other material appropriate to one of ordinary skill in the art. In use, two split hubs 501 may be fixed to each other, around two split adapters 301. Each split hub 501 may have a means to connect the first split hub 501 to the second split hub 501. In an embodiment, the means of connecting the first split hub 501 to the second split hub 501, may be multiple thumb screws 202 (or other means of attachment) that pass through one split hub at a nonthreaded hole 503 and screw into the opposing hub 501 at a threaded hole or insert 504.

An embodiment of a hub 501 may have a groove or a guide 507 near its outer most edges. The groove or guide 507 may be formed by an outer rim 505 and an inner rim 506 with a space between. The guide 507, created by the inner rim 506 and outer rim 505, may be used to guide the rotation of the split wheels 601 around the split hubs 501. In an embodiment, the inner rim 506, outer rim 505, and groove 507 may be made of plastic and capped in metal to ensure longevity and ideal operation.

In an embodiment, the split adapters 301 and split hubs 501 may be a single adapter-hub entity. In such an embodiment, the inner radius of the adapter-hub may be lined with rubber, or other material of sufficient coefficient of friction, to prevent the assembly from sliding along the axis of rotation.

Exemplary FIGS. 6a-7b show different views of an exemplary embodiment of a split wheel 601. In particular, FIG. 6b shows a perspective view of an embodiment of a split wheel 601. The split wheel 601 may be manufactured of plastic, metal or any other material appropriate to one of ordinary skill in the art. In an embodiment two split wheels 601 may be pushed together and fixed to each other around two split hubs 501. The split wheels 601 may have a tongue 608 over one half of the split wheel 601 and a corresponding groove 607 over the other half of the split wheel 601. When two split wheels 601 are put together, the tongue 608 of one split wheel may fit into the groove 607 of the opposing wheel. This may give the wheel assembly 101 more stability in use.

In an exemplary embodiment, the structure for fixing one split wheel 601 to another 601 may be two projections 602 and two cavities 606 on either split wheel 601. Each projection 602 may have a corresponding cavity 606 on the opposing split wheel 601, into which the projections of the first split wheel fit when the two split wheels 601 are together. The projections 602 and cavities 606 may have holes 605 that align when the two split wheels 601 are together. In an embodiment, the structure for fixing two split wheels 601 may be push rivets 102 in each hole 605. In another embodiment, the inside hole 605 of each hole pair may be threaded, and the method of fixing the two split wheels 601 is via a screw in each hole pair.

In other embodiments, the structure for affixing the two split wheels 601 to each other may vary. In one embodiment, the method may be one or multiple plates that attach to the split wheels 601 on their faces on either side of the assembly 101. The plates may extend over the seams of the two split wheels 601. The plates may then be fixed in place, fixing the two split wheels 601 together. The structure for affixing the plates to the split wheels 601 may include holes and push rivets or screws, as above.

Once affixed to each other, the wheels 601 may freely rotate around the split hubs 501. In an embodiment, split wheels 601 may be slotted into grooves or guides 507 on the split hubs 501 at the point of contact between the split wheel 601 and the split hubs 501. In an embodiment, the split wheels 601 may be made of plastic and, at the point(s) of contact between the split wheel 601 and split hubs, 501 may be capped in metal to ensure longevity and ideal operation.

The split wheels 601 may be manufactured with a shield 603 that may protect from debris that could foul the area of contact between the split hubs 501 and the split wheels 601. The shield 603 may be larger or smaller depending on the embodiment.

Further, according to an exemplary embodiment, the wheel and hub assembly may be applied not only to a beach chair, but also to other assemblies in other materials such as sporting equipment, for example, soccer goals etc.

The foregoing description and accompanying figures illustrate the principles, exemplary embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A wheel assembly comprising:
   a first split adapter;
   a second split adapter;
   a first split hub;
   a second split hub;
   a first split wheel; and
   a second split wheel;
   wherein the first split adapter and the second split adapter fit around a beach chair's lower horizontal rod; the first split hub and the second split hub are clamped to each other around the first split adapter and the second split adapter; and the first split wheel and the second split wheel are fixed to each other and are rotatable around the first split hub and the second split hub.

2. The assembly of claim 1, wherein the first split adapter and the second split adapter are made of rubber.

3. The assembly of claim 1, wherein the first split adapter and the second split adapter are made of a material with a sufficient coefficient of friction to prevent the assembly from sliding along its axis of rotation.

4. The assembly of claim 1, wherein the first split hub and the second split hub are fixed around the first split adapter and the second split adapter via at least two thumb screws in the first adapter, and the assembly further comprising threads to receive the thumb screws in the second adapter; and an additional at least two thumb screws in the second adapter, and threads to receive the additional thumb screws in the first adapter.

5. The assembly of claim 1, wherein the first split hub and the second split hub are fixed around the first split adapter and the second split adapter via push rivets.

6. The assembly of claim 1, wherein the first split hub has a guide on its outer most edge, and the second split hub has a guide on its outer most edge, and where the first split wheel and the second split wheel are slotted into said guides.

7. The assembly of claim 6, wherein the first split hub, the second split hub, the first split wheel, and the second split wheel are made of plastic, and where the guide area of the first split hub and the guide area of the second split hub are capped in metal, and where the first split wheel and the second split wheel are capped in metal at the point of contact with the first split hub and the second split hub.

8. The assembly of claim 1, wherein the first split wheel has a first shield protecting an area of contact between the split wheels and the split hubs, and where the second split wheel has a respective second shield protecting the area of contact between the split wheels and the split hubs.

9. The assembly of claim 1, wherein the first split hub and the second split hub are made of plastic.

10. The assembly of claim 1, wherein the first split hub and the second split hub are made of metal.

11. The assembly of claim 1, wherein the first split wheel and the second split wheel are made of plastic.

12. The assembly of claim 1, wherein the first split wheel and the second split wheel are made of metal.

13. A wheel assembly comprising:
a first split hub;
a second split hub;
a first split wheel; and
a second split wheel;
wherein the first split hub and the second split hub fit around a beach chair's lower horizontal rod and are fixed to each other; the first split wheel and the second split wheel are fixed to each other and are rotatable around the first split hub and the second split hub, and wherein the first split hub is lined on its interior radius with rubber and the second split hub is lined on its interior radius with rubber.

* * * * *